(12) United States Patent
Farrell

(10) Patent No.: US 8,456,679 B2
(45) Date of Patent: Jun. 4, 2013

(54) SYSTEM AND METHOD FOR GENERATING A REMOTE JOB SUBMISSION ACCELERATOR REPORT IN A MULTI-FUNCTION DEVICE

(75) Inventor: Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 12/849,523

(22) Filed: Aug. 3, 2010

(65) Prior Publication Data

US 2012/0033248 A1    Feb. 9, 2012

(51) Int. Cl.
*G06F 3/12* (2006.01)
(52) U.S. Cl.
USPC ........ 358/1.15; 358/1.14; 358/1.13; 700/213; 700/214; 700/215
(58) Field of Classification Search
USPC .............. 358/1.15, 1.14, 1.13; 700/213, 214, 700/215
See application file for complete search history.

(56) References Cited

U.S. PATENT DOCUMENTS

| | | | |
|---|---|---|---|
| 5,920,405 A | 7/1999 | McIntyre et al. | |
| 6,494,375 B1 | 12/2002 | Ishibashi et al. | |
| 6,722,565 B2 | 4/2004 | Takeuchi et al. | |
| 7,474,428 B2 | 1/2009 | Morris-Jones et al. | |
| 7,525,676 B2 | 4/2009 | Pesar | |
| 7,648,072 B2 | 1/2010 | Yada | |
| 7,710,589 B2 | 5/2010 | Sodeura et al. | |
| 2007/0019232 A1* | 1/2007 | Kano | 358/1.15 |
| 2007/0165268 A1* | 7/2007 | Sodeura et al. | 358/1.15 |
| 2008/0025736 A1* | 1/2008 | Suzuki | 399/15 |
| 2010/0091321 A1* | 4/2010 | LeVier et al. | 358/1.15 |
| 2012/0008161 A1* | 1/2012 | Rouhana | 358/1.15 |

* cited by examiner

*Primary Examiner* — Jacky X Zheng
(74) *Attorney, Agent, or Firm* — Kermit D. Lopez; Luis M. Ortiz; Melissa Asfahani

(57) ABSTRACT

A system and method for generating a remote job submission accelerator report with respect to a network multi-function device. A multi-function device can be configured to receive a job from a mobile communication device via a submission path. A text representation with respect to the submission path and a spatial representation with respect to the text representation can be automatically generated. An accelerator report can be generated based on the text representation and the spatial representation and the report can be added to a cover page of the job. Such an approach effectively enables client-less job submission with respect to the multi-function device.

17 Claims, 4 Drawing Sheets

SYSTEM AND METHOD FOR GENERATING A REMOTE JOB SUBMISSION ACCELERATOR REPORT IN A MULTI-FUNCTION DEVICE

TECHNICAL FIELD

Embodiments are generally related to multi-function devices such as, for example, printers, scanners, photocopy machines, and the like. Embodiments are also related to mobile rendering techniques. Embodiments are additionally related to methods and systems for generating remote job submission accelerator report with respect to an MFD (Multi-Function Device).

BACKGROUND OF THE INVENTION

Network printing systems generally include an assemblage of varying multi-function devices, client computers, servers, and other components that are connected to and communicate over a network. Multi-function devices include components such as, for example, printers, scanners, faxes, copy machines, and so forth. Such network printing system can be communicatively linked with a mobile communication device in order to provide various operations such as, for example, printing, scanning, and other operations within the network.

The mobile communication device such as, for example, smart phone, personal digital assistance (PDA), pocket PC, and other handheld computing devices can include a host application that enables the device to operatively communicate with the network printing system. The host application associated with the mobile device provides an abstracted interface between the mobile device and a specific multi-function device to communicate a job (e.g., a rendering job or other job type) including, for example, a set of text, graphic, and layout commands.

The majority of prior art approaches for connecting and submitting a rendering job from the mobile device to the multi-function device, for example, require a device identity such as, for example, an IP address or a network name with respect to the multi-function device. Such device identity typically includes one or more long text strings that are displayed at a user interface (UI) of the multi-function device. Navigating the user interface associated with unfamiliar multi-function devices for determining the device identity can be a time consuming process. Furthermore, the manual process of transcribing the device identity from the user interface can be prone to errors. An EIP (Extensible Interface Platform) enabled mobile print application for rendering the jobs with respect to the mobile communication device eliminates the need for device specific identity. Such an application, however, requires a print server e-mail address for transmitting the job from the mobile communication device to the multi-function device.

Based on the foregoing, it is believed that a need therefore exists for an improved system and method for generating a remote job submission accelerator report with respect to a multi-function device in order to enable client-less job submission, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a multi-function device (MFD) such as a printer, scanner, photocopy machine, fax machine, etc., or a combination thereof.

It is another aspect of the disclosed embodiments to provide for an improved system and method for generating a remote job submission accelerator report with respect to the multi-function device.

It is a further aspect of the disclosed embodiments to provide for an improved method for configuring the remote job submission accelerator report in association with the multi-function device in order to enable client-less job submission.

The aforementioned aspects and other objectives and advantages can now be achieved as described herein. A system and method for generating a remote job submission accelerator report with respect to a network multi-function device is disclosed herein. A multi-function device can be configured to receive a job (e.g., a rendering job or other job type) from a mobile communication device via a submission path (e.g., a Web service, an e-mail address, or a hot folder). A text representation with respect to the submission path and a spatial representation (e.g., a quick response (QR) code, a Microsoft tag, a data glyph, and a data matrix code) with respect to the text representation can be automatically generated. An accelerator report can be generated based on the text representation and the spatial representation and the report can be added to a cover page (e.g., a banner and/or a break page) of the job. Such an approach effectively enables client-less job submission with respect to the multi-function device.

A policy governing application, for example, can be cloned/shared with respect to the network multi-function device in order to select the job submission path and to render the text representation and the spatial representation with respect to the job. The policy governing application can also be employed to render the spatial representation of a reprint job address on the cover page if the job is stored for reprinting. The cover page associated with the job includes a supplementary material such as an esoteric page containing accounting or chargeback information, advertising sheets, and Post-It style notes that are utilized as job separators.

The accelerator report can be optionally affixed and/or posted in association with the multi-function device. The accelerator report can be scanned via an image capturing unit associated with the mobile communication device for mobile rendering application. The spatial representation with respect to the text representation can be rendered in order to re-print the job that is stored in association with the multi-function device. The accelerator report can be a free-standing report that includes one or more remote job submission accelerators such as a textual representation (e.g., a URL, an e-mail address, a hot folder path, etc.) and a machine scan-able representation with respect to the multi-function device. The system and method automatically connects and renders the jobs via the mobile communication device with no additional hardware requirement.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
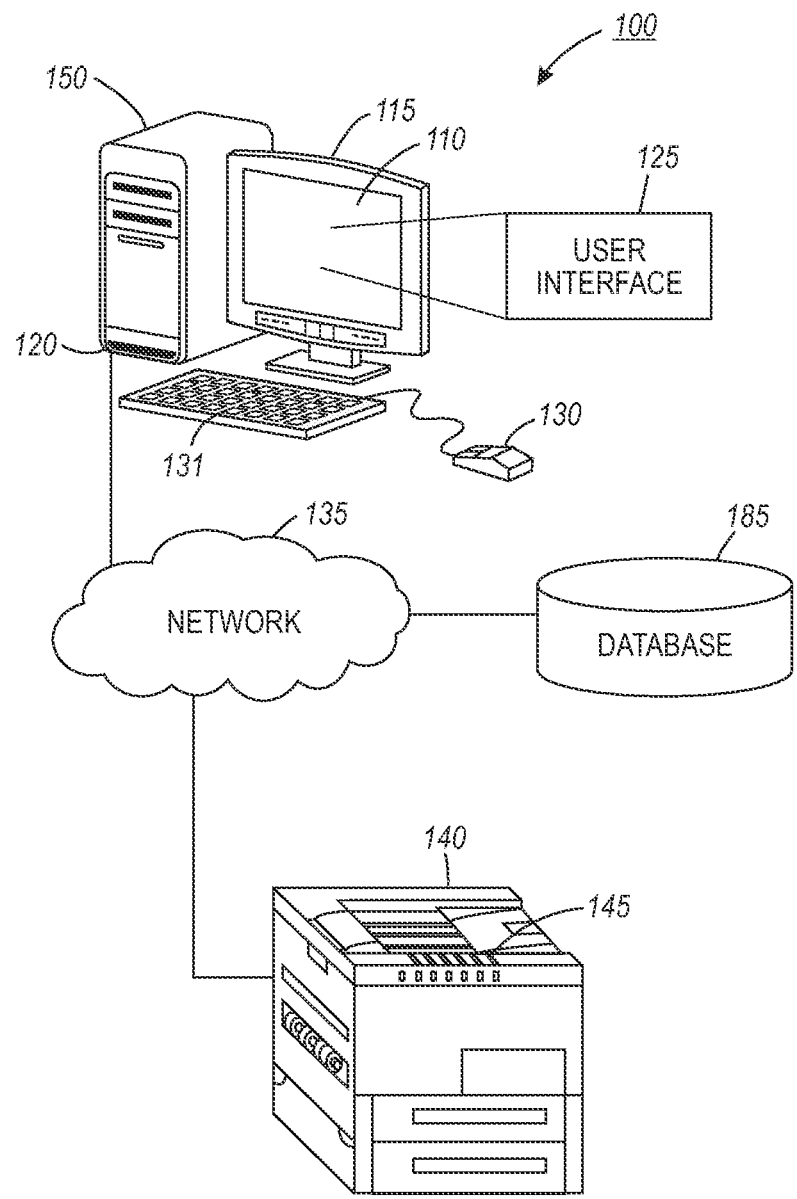
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 can include a MFD 140 coupled to a data-processing apparatus 110 through a network 135. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the multi-function device 140, may be included in association with the data-processing apparatus 110 as desired.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 may be implemented with a single rendering function such as printing. In other embodiments, MFD 140 can be configured to provide multiple rendering functions such as scanning, faxing, printing and copying. Note that the MFD 142 described in greater detail herein is analogous or similar to MFD 140.

A non-limiting example of a MFD that can be utilized as MFD 140 and/or 142 is disclosed in U.S. Pat. No. 7,525,676, entitled "System and Method for Controlling Access to Programming Options of a Multi-function device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as MFD 140 and/or 142 is disclosed in U.S. Pat. No. 7,474,428, entitled "Multifunction device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as MFD 140 and/or 142 is disclosed in U.S. Pat. No. 5,920,405, entitled "Multi-function device With Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Stamford, Conn.

The data-processing apparatus 110 can be coupled to the MFD 140 through a computer network 135. Network 135 may employ any network topology, transmission medium, or network protocol. Network 135 may include connections such as wire, wireless communication links, or fiber optic cables. The MFD 140 includes a user interface 145, such as a panel menu. The panel menu may be used to select features and enter other data in the MFD 140. Such interfaces may include, for example, touch screens having touch activated keys for navigating through an option menu or the like.

A MFD driver program can be installed on the data-processing apparatus 110 and can reside on the host device's hard drive 150. The MFD driver program may be activated through an application interface so that a user may generate a print job with the MFD driver for processing by the MFD 140. The data-processing apparatus 110 also includes a GUI 125 for communicating MFD features for processing, for example, a print job to a user and accepting the user's selection of available MFD features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the multi-function devices 140 may be a local user interface 145 such as, for example, a touchscreen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and MFD 140 depicted in FIG. 1. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
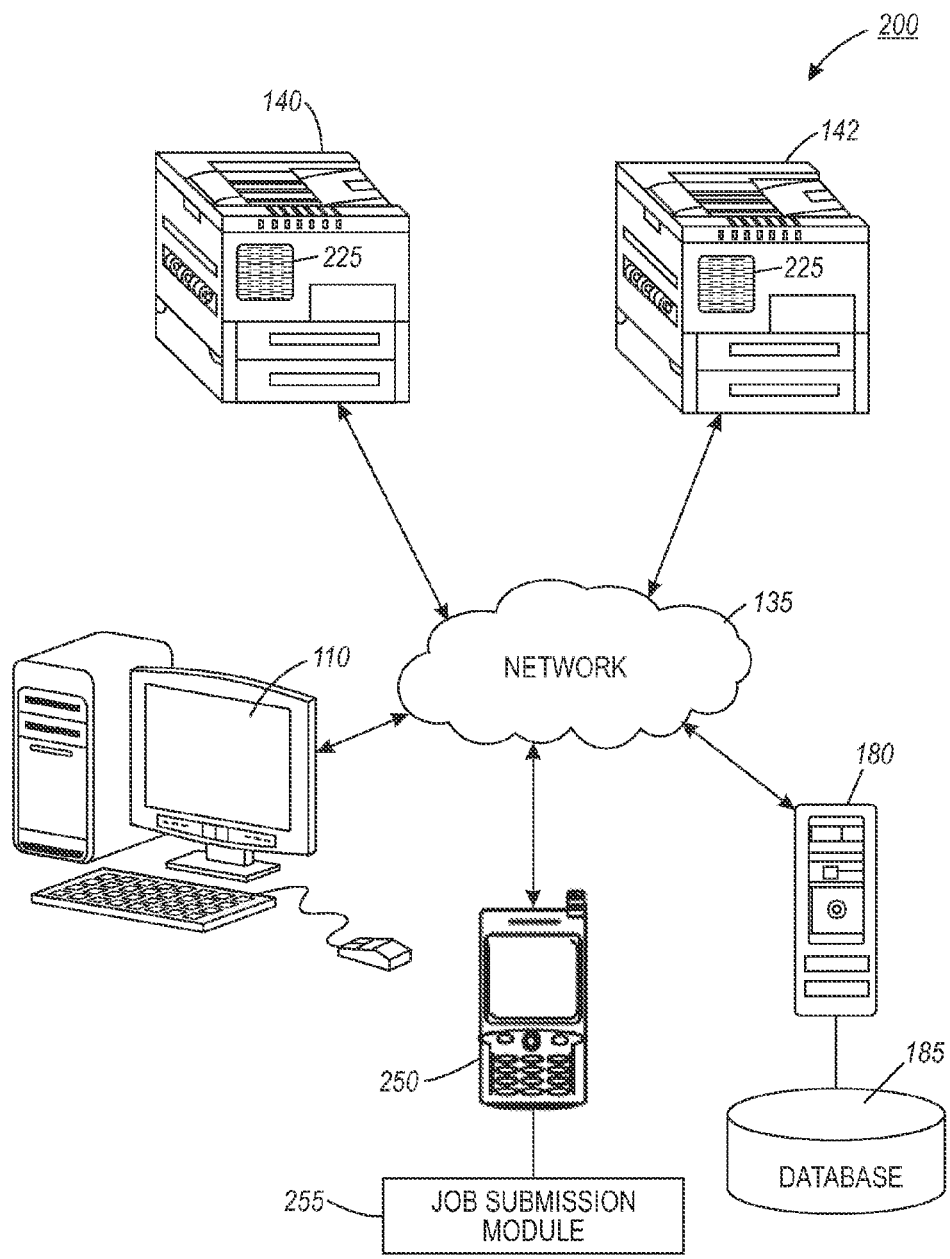
FIG. 2 illustrates a graphical representation of a remote job submission system associated with a network, in accordance with the disclosed embodiments.

FIG. 2 illustrates a graphical representation of a remote job submission system 200 associated with a network 135, in accordance with the disclosed embodiments. Note that in FIGS. 1-4, identical or similar blocks are generally indicated by identical reference numerals. The job submission system 200 generally includes a network infrastructure 135 associated with one or more multi-function devices 140 and 142, the data-processing system 110, a mobile communication device 250, and a print server 180 associated with a database 185. Note that the print server 180 can be a discrete print server. The MFD's 140 and 142 may typically include built-in (embedded) network and print services. It is therefore the print server 180 and the database 185 can be an optional feature and may be utilized in some embodiments without departing from the scope of the invention.

Data-processing system 110 depicted in FIG. 1 can be, for example, a server. Other devices such as, for example, desktops, network devices, palmtops, mobile phones, etc. may also be included in the network 135 as service providers. The MFDs 140 and 142 can be located remotely with respect to each other, or alternatively, such devices may be located locally with respect to each other.

Note that a MFD is an office machine that incorporates the functionality of multiple devices in one so as to provide centralized document management, document distribution, and production in a large-office setting and the like. A typical MFD may act as a combination of a printer, scanner, photocopier, fax, and e-mail. While two MFDs 140 and 142 are shown by way of example, it is to be appreciated that any number of rendering devices may be linked to the network such as three, four, six or more rendering devices. In general, the MFDs 140 and 142 can perform rendering output functions (e.g., printing, scanning, copying, faxing, etc.) within a networked environment. Note that MFDs 140 and 142 are generally analogous to one another.

The MFDs 140 and 142 can be configured in association with an accelerator report 225 that includes address information with respect to the MFDs 140 and 142. In general, the accelerator report 225 includes a textual representation such as, for example, uniform resource locator (URL), an e-mail address, and/or a hot folder path with respect to the MFDs 140 and 142. The accelerator report 225 also includes a machine scan-able representation of print job submission mechanisms such as, for example, quick response codes, Microsoft tags, data glyph, and data matrix code with respect to the multi-function device 140 and 142. The accelerator report 225 can be affixed/posted in association with the multi-function device 140 and 142 in order to enable client-less job submission in the multi-function device 140 and 142 within the network 135.

A job submission module 255 associated with the mobile communication device 250 can be adapted for submitting the jobs from the mobile communication device 250 to the multi-function device 140 and 142. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module) and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
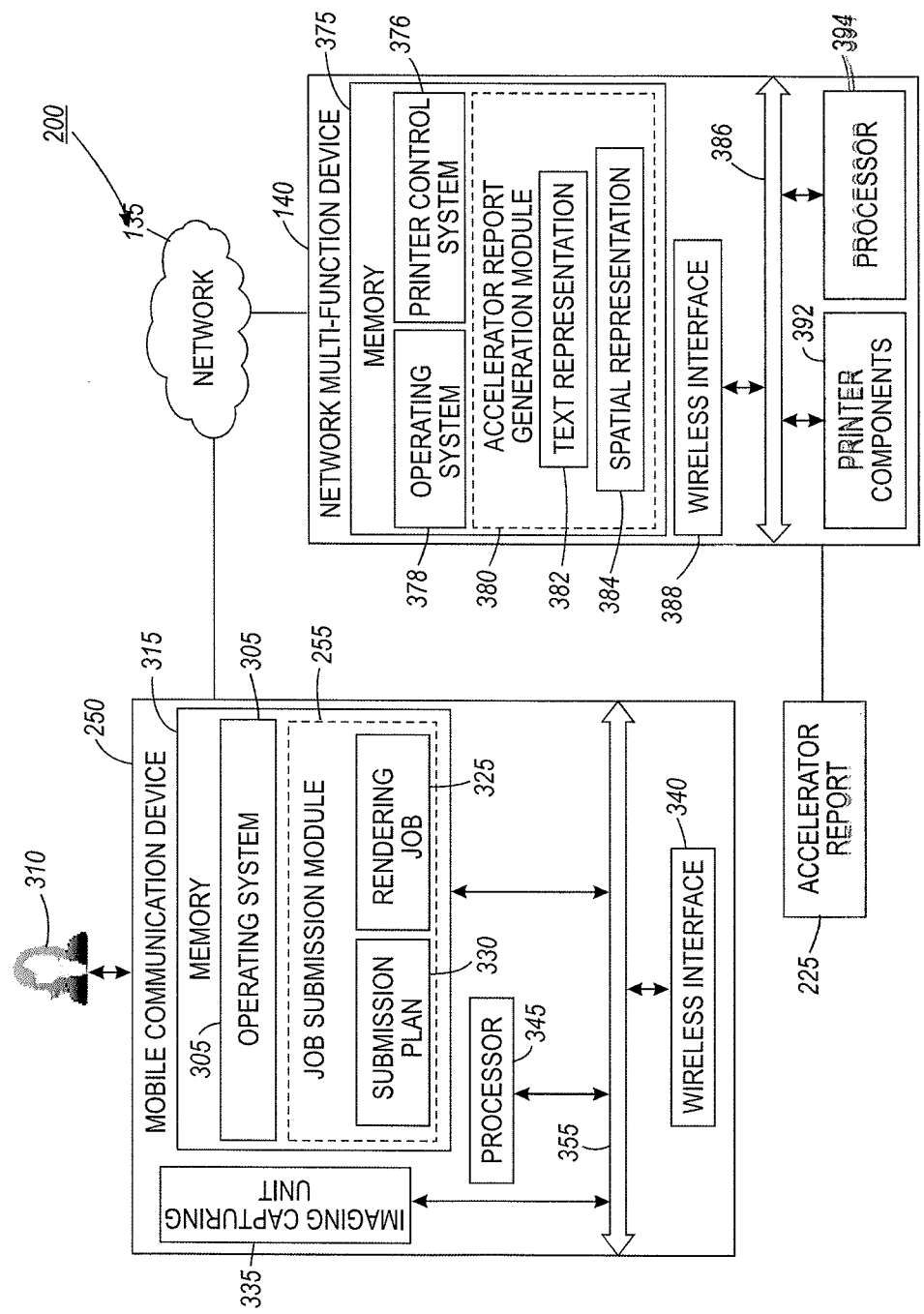
FIG. 3 illustrates a block diagram of the remote job submission system, in accordance with the disclosed embodiments.

FIG. 3 illustrates a block diagram of the remote job submission system 200, in accordance with the disclosed embodiments. The mobile rendering system 200 includes the mobile communication device 250 and the multi-function device 140 that are operatively communicated through the network 135. The mobile communication device 250 can be such as, for example, a Smartphone, a personal digital assistant (PDA), and the like which offers a wide range of capabilities including storing and editing documents, receiving and sending electronic mails, and storing/viewing images. The mobile communication device 250 includes an image capturing unit 335, a memory 315, and a processor 345 coupled to a local interface 355. The image capturing unit 335 may be generally employed to capture an image of the accelerator report 225 associated with the multi-function device 140.

The image capturing unit 335 may include built-in integrated functions such as image processing, data formatting, and data compression functions. Additionally, the image capturing unit 335 includes imager-positioning, range-finding, and a flash bulb. The local interface 355 can be, for example, a data bus with an accompanying control/address bus. A wireless interface 340 facilitates wireless communication with the multi-function device 140 and other wireless devices and/or networks. The memory 315 stores several components that are executable by the processor 345. The components include, for example, an operating system 305 and the job submission module 255. The job submission module 255 can be utilized to transmit the job 325 with respect to a mobile user 310 via a submission path 330. The submission path 330 can be, for example, a web, an e-mail, or a hot folder path.

The multi-function device 140 includes a processor circuit having a memory 375 and a processor 394 coupled to a local interface 386. The memory 375 can be configured to include, for example, an operating system 378, a printer control system 376, and an accelerator report generation module 380 that are executable by the processor 394. The memory 375 can also include, for example, a policy governing application. The multi-function device 140 also includes various MFD components 392 such as motors and mechanical paper path components as well as image creation components. A wireless network interface 388 coupled to the local interface 386 facilitates wireless communication with respect to the multi-function device 140.

The multi-function device 140 can be configured to accept the job 325 from the mobile communication system 250 via the submission path 330. A policy governing application associated with the multi-function device 140 can be utilized to select the job submission path 330 in order to render the text representation 382 and the spatial representation 384 in the network multi-function device 140. The policy governing application can be cloned/shared along the network multi-function device 140 and 142 in order to select the job submission path 330 with respect to the job 325.

The accelerator report generation module 380 can automatically generate a text representation 382 with respect to the submission path 330 in the multi-function device 140. The accelerator report generation module 380 further generates a spatial representation 384 with respect to the multi-function device 140 based on the text representation 382. The spatial representation 384 with respect to the text representation 382 can be rendered in order to re-print the job 325 that is stored in the multi-function device 140. Note that the spatial representation 384 can be, for example, the quick response (QR) code, the Microsoft tag, the data glyph, and the data matrix code.

The multi-function device 140 further utilizes the spatial representation 384 and the text representation 382 in order to generate the accelerator report 225 with respect to the multi-function device 140. Such an accelerator report 225 can be a free-standing report that includes one or more remote job submission accelerators such as a textual representation and a machine scan-able representation with respect to the multi-function device. The accelerator report 225 also includes varying other information such as an IP (Internet Protocol) address and URL (Uniform Resource Locator) that can be utilized to support automated work flow with respect to the multi-function device 140. Such information associated with the accelerator report 225 automates the process of submitting the job 325 from the mobile communication device 250 to the multi-function device 140 via the network 135. The acceleration report 225 can then be added to a cover page of the job 325. The aforementioned policy governing application can also be employed to render the spatial representation 384 of a reprint job address on the cover page if the job 325 is stored for reprinting.

Note that the cover page associated with the job 325 can be a banner page or a break page that includes a supplementary material such as an esoteric page containing accounting or chargeback information, advertising sheets, and Post-It style notes that are utilized as job separators. The accelerator report 225 thus formed can be read by the image capturing unit 335 associated with the mobile device 250 having appropriate decoding software that can photograph and decode the accelerator report 225. The accelerator report 225 can be scanned via the image capturing unit 335 associated with the mobile device 250 for retrieving information required to support an automated workflow (e.g. an e-mail application, a URL of the device controller, or a webpage) in the network 135.

Figure 4:
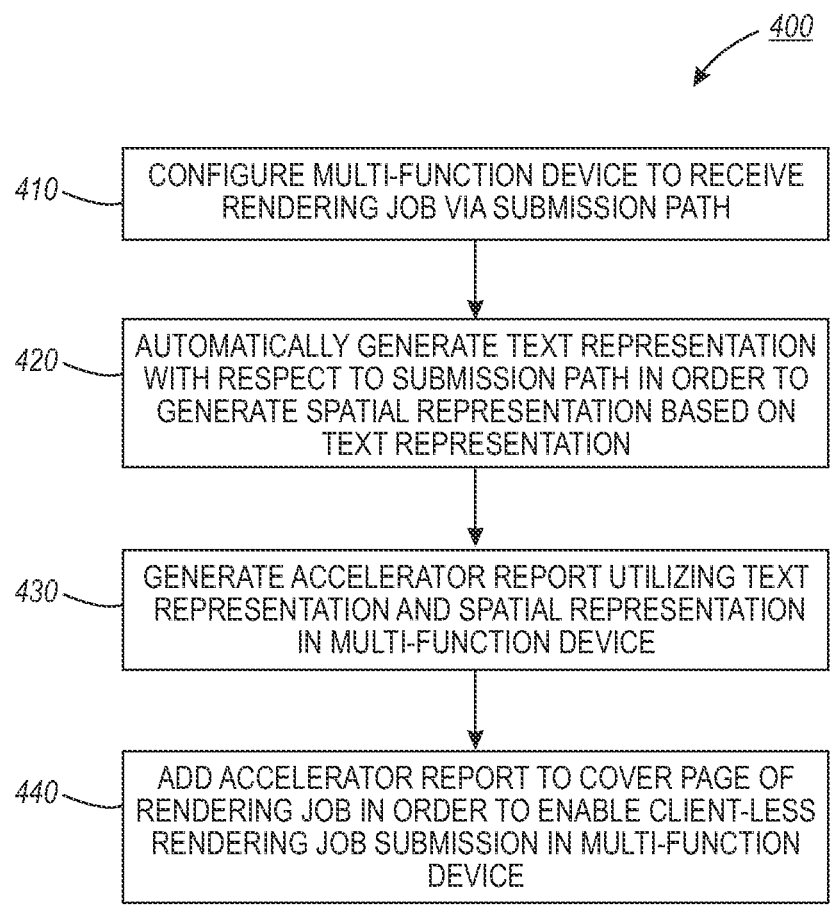
FIG. 4 illustrates a high level flow chart of operation illustrating logical operational steps of a method for generating a remote job submission accelerator report with respect to a multi-function device, in accordance with the disclosed embodiments.

FIG. 4 illustrates a high level flow chart of operation illustrating logical operational steps of a method 400 for generating the remote job submission accelerator report 225 with respect to the multi-function device 140, in accordance with the disclosed embodiments. The multi-function device 140 can be configured to receive the job 325 from the mobile communication device 250 via the submission path 330, as illustrated at block 410. Further, the text representation 382 with respect to the submission path 330 can be automatically generated in order to generate the spatial representation 384 with respect to the text representation 382, as depicted at block 420.

The text representation 382 and the spatial representation 384 can be further utilized to generate the accelerator report 225, as illustrated at block 430. The accelerator report 225 can be a two-dimensional code representation of the print job submission mechanism that can be rendered in the multi-function device 140. The accelerator report 225 can be generated via a programmatic method such as, for example, an API to a bar code service. The accelerator report 225 can be thereafter added to the cover page of the job 325 in order to enable client-less job submission in the multi-function device 140, as illustrated at block 440. The system and method automatically connects and renders the jobs via the mobile communication device with no additional hardware requirement.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for generating a remote job submission accelerator report, comprising:
automatically generating a text representation with respect to a submission path and a spatial representation with respect to said text representation associated with said submission path;
selecting said submission path via a panel menu in said multi-function device, wherein said selection is based on a policy governance application to render said text representation and said spatial representation in said network multi-function device; and
generating an accelerator report based on said text representation and said spatial representation, wherein said accelerator report comprises a two-dimensional quick response code representative of a print job submission mechanism for rendering and further comprises information required to support an automated workflow, wherein said information comprises an Internet Protocol address and Uniform Resource Locator for automated submission of a job from a mobile communication device to said network multi-function device, to thereafter add said report to a cover page associated with said job, thereby enabling a client-less job submission with respect to said network multi-function device.

2. The method of claim 1 further comprising configuring said policy governance application with respect to a plurality of network multi-function devices.

3. The method of claim 1 further comprising rendering said spatial representation of a reprint job address on said cover page based on a policy governing application if said job is stored for reprint.

4. The method of claim 1 further comprising configuring said report to include at least one remote job submission accelerator and at least one machine scan-able representation with respect to said network multi-function device.

5. The method of claim 1 further comprising configuring said cover page associated with said job to comprise a supplementary material.

6. The method of claim 5 wherein said supplementary material comprises an esoteric page.

7. The method of claim 1 further comprising configuring said job submission path to comprise at least one of the following paths:
a Web service;
an electronic mail address; and
a hot folder.

8. The method of claim 1 further comprising configuring said spatial representation to include at least one of the following types of address information:
a quick response code;
a Microsoft tag;

a data glyph; and a data matrix code.

9. The method of claim 1 wherein said cover page comprises a banner page.

10. The method of claim 1 wherein said cover page comprises a break page.

11. A system for generating a remote job submission accelerator report, said system comprising:

a processor;

a data bus coupled to said processor; and a computer-usable medium embodying computer code, said computer-usable medium being coupled to said data bus, said computer program code comprising instructions executable by said processor and configured for:

automatically generating a text representation with respect to a submission path and a spatial representation with respect to said text representation associated with said submission path;

selecting said submission path via a panel menu in said multi-function device, wherein said selection is based on a policy governance application to render said text representation and said spatial representation in said network multi-function device; and generating an accelerator report based on said text representation and said spatial representation, wherein said accelerator report comprises a two-dimensional quick response code representative of a print job submission mechanism for rendering and further comprises information required to support an automated workflow, wherein said information comprises an Internet Protocol address and Uniform Resource Locator for automated submission of a job from a mobile communication device to said network multi-function device, to thereafter add said report to a cover page associated with said job, thereby enabling a client-less job submission with respect to said network multi-function device.

12. The system of claim 11 wherein said instructions are further modified for configuring said policy governance application with respect to a plurality of network multi-function devices.

13. The system of claim 11 wherein said instructions are further configured for rendering said spatial representation of a reprint job address on said cover page based on a policy governing application if said job is stored for reprint.

14. The system of claim 11 wherein said instructions are further modified for configuring said report to include at least one remote job submission accelerator and at least one machine scan-able representation with respect to said network multi-function device.

15. The system of claim 11 wherein said instructions are further modified for configuring said cover page associated with said job to comprise supplementary material.

16. The system of claim 15 wherein said supplementary material comprises an esoteric page.

17. The system of claim 11 wherein;

said instructions are further modified for configuring said job submission path to comprise at least one of the following paths:

a Web service;

an electronic mail address;

a hot folder;

said instructions are further modified for configuring said spatial representation to include at least one of the following types of address information:

a quick response code;

a Microsoft tag;

a data glyph; and a data matrix code.

* * * * *